UNITED STATES PATENT OFFICE.

EDMOND BOUVIER, OF PENSACOLA, FLORIDA, ASSIGNOR OF ONE-HALF HIS RIGHT TO CHARLES HENRY BITHORN, OF SAME PLACE.

IMPROVEMENT IN SOLUTIONS FOR PRESERVING TIMBER.

Specification forming part of Letters Patent No. 218,659, dated August 19, 1879; application filed April 25, 1879.

*To all whom it may concern:*

Be it known that I, EDMOND BOUVIER, doctor of the medical faculty of Paris, actually residing at Pensacola, Escambia county, State of Florida, have invented a new and useful process for preserving wood against moldiness, decay, or against destruction by insects, which process is fully set forth in the following specification.

This invention relates to that class of processes employed for preserving wood of all kinds. Wood is composed of a cellular and other substance called "ligneous" or "incrusted" matter, which covers the inner partitions of the cells. This incrusted matter is generally of a yellow or brownish color, is very abundant in hard woods, and is the focus of destruction or decay of wood. Wood which is submitted simultaneously to the influence of the air and of humidity becomes decomposed by degrees, and is transformed into a brown or blackish matter called "mold" or "humus." This alteration is the result of a slow fermentation produced by azotic or nitrogenous gaseous matter, which the juice or sap of a tree deposits in the tissue of the wood. Often the wood is also destroyed by divers insects, which lodge themselves in the cells and destroy the woody or ligneous substance by boring into it and consuming it both on land as well as in the sea.

Acquainted with the internal structure of wood, and knowing its destructive agents, I claim to have found a sure, effective, and practical remedy for preserving wood against such decay or destruction by a process which is easily performed, and is cheaper and more effective as a powerful antiseptic than any other invented or employed hitherto.

In carrying out my invention I protect and preserve wood by allowing sulphate of copper and benzoic acid in due proportion to penetrate by the general vital aspiration of trees when they are yet standing and green or when recently cut, to which solution a liquid coloring substance can be added for giving the wood any desired color. This powerful antiseptic is soon absorbed by vital aspiration of the wood when fresh, and protects and preserves wood from decay or putrefaction, and, on account of its poisonous substance, from attacks of all kinds of insects.

The above solution should be made in the following strength: two hundred and fifty grams of sulphate of copper, and one gram of benzoic acid dissolved in alcohol, to be added to one thousand grams of water.

When the tree is yet growing or standing I make a circular incision at the lower part of the trunk, to which I attach a recipient filled with the foregoing compound or preservative substance, so that this liquid compound will be communicated to the tree through the circular incision. By degrees the liquid compound mounts through the conducting cells or channels of the sap, and spreads over all the parts of the stem and branches of the tree by aspiration. When the tree is recently cut it is placed horizontal, and the aforestated preservative liquid compound is placed in an impermeable sack, which is closely and tightly attached to the lower end of the tree. The absorption of this liquid commences immediately, and forces the same through all the vegetable substance, where it takes the place of the sap, and by this fact guarantees and preserves the wood against molding or insects.

It will be easily understood that this process can only be profitably employed while the tree is green or the wood is fresh or recently cut.

For preserving old or seasoned wood it will be requisite to submerge the wood horizontally into a trough containing the aforestated solution of sulphate of copper and benzoic acid, by which process also green wood will sooner absorb the solution on account of the greater surface to act upon.

I claim as my invention—

The herein-described compound for preserving wood, consisting of sulphate of copper with benzoic acid in solution, substantially as set forth.

DR. E. BOUVIER.

Witnesses:
S. M. RYERSON,
C. H. BITHORN.